United States Patent
Lavaud et al.

(10) Patent No.: US 7,024,682 B2
(45) Date of Patent: Apr. 4, 2006

(54) SOFTWARE CONTROLLED MULTI-MODE BI-DIRECTIONAL COMMUNICATION DEVICE

(75) Inventors: Simon Lavaud, Fishers, IN (US); Rodger Anthony Diemer, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 359 days.

(21) Appl. No.: 10/120,079

(22) Filed: Apr. 10, 2002

(65) Prior Publication Data

US 2003/0013453 A1 Jan. 16, 2003

Related U.S. Application Data

(60) Provisional application No. 60/305,219, filed on Jul. 13, 2001.

(51) Int. Cl.
*H04N 7/173* (2006.01)

(52) U.S. Cl. ............ 725/126; 725/107; 725/124; 725/127

(58) Field of Classification Search ......... 725/107, 725/111, 124–127
See application file for complete search history.

(56) References Cited

U.S. PATENT DOCUMENTS

| | | | |
|---|---|---|---|
| 4,397,037 A | 8/1983 | Theriault | 455/188 |
| 4,480,338 A | 10/1984 | Dobrovolny | 455/188 |
| 4,499,495 A | 2/1985 | Strammello | 358/188 |
| 4,912,436 A | 3/1990 | Alford et al. | 333/135 |
| 5,719,792 A | 2/1998 | Bush | 364/574 |
| 5,870,134 A | 2/1999 | Laubach et al. | 348/12 |
| 5,881,369 A | 3/1999 | Dean et al. | 455/78 |
| 5,986,691 A | 11/1999 | Henderson | 348/12 |
| 6,002,722 A * | 12/1999 | Wu | 375/295 |
| 6,011,548 A * | 1/2000 | Thacker | 725/105 |
| 6,072,993 A | 6/2000 | Trikha et al. | 455/78 |
| 6,075,972 A | 6/2000 | Laubach et al. | 455/5.1 |
| 6,118,672 A | 9/2000 | Yamauchi et al. | 361/818 |
| 6,124,766 A | 9/2000 | Matsuura | 331/117 R |
| 6,131,023 A | 10/2000 | Matsuura | 455/301 |
| 6,151,559 A * | 11/2000 | Williams | 702/58 |
| 6,160,571 A * | 12/2000 | Wang | 725/127 |
| 6,160,572 A | 12/2000 | Matsuura | 348/11 |
| 6,169,569 B1 * | 1/2001 | Widmer et al. | 725/111 |
| 6,285,706 B1 | 9/2001 | Skinker et al. | 375/222 |
| 6,295,554 B1 | 9/2001 | Karadogan et al. | 709/219 |
| 6,327,264 B1 * | 12/2001 | Terry et al. | 370/445 |
| 6,567,654 B1 * | 5/2003 | Coronel Arredondo et al. | 455/315 |
| 6,588,016 B1 * | 7/2003 | Chen et al. | 725/111 |
| 6,594,467 B1 * | 7/2003 | Asia et al. | 455/3.03 |
| 6,662,135 B1 * | 12/2003 | Burns et al. | 702/120 |
| 2002/0073432 A1 * | 6/2002 | Kolze | 725/111 |
| 2002/0147978 A1 * | 10/2002 | Dolgonos et al. | 725/62 |
| 2002/0157106 A1 * | 10/2002 | Uskali et al. | 725/107 |
| 2003/0002495 A1 * | 1/2003 | Shahar et al. | 370/389 |

* cited by examiner

*Primary Examiner*—Kieu-Oanh Bui
(74) *Attorney, Agent, or Firm*—Joseph J. Laks; Ronald H. Kurdyla; Guy H. Eriksen

(57) ABSTRACT

Disclosed are a method and bi-directional communication device, such as a cable modem, for iteratively performing the following steps for each of a plurality of communications channels until a downstream data signal is detected. Selecting a communications channel and checking for a downstream signal having a first bandwidth complying with a first system interface standard, and if the downstream signal having said first bandwidth is not detected, then checking the communications channel for a downstream signal having a second bandwidth complying with a second system interface standard.

25 Claims, 5 Drawing Sheets

SOFTWARE CONTROLLED MULTI-MODE BI-DIRECTIONAL COMMUNICATION DEVICE

CROSS REFERENCE TO RELATED APPLICATIONS

This patent application claims the benefit of U.S. Provisional Application Ser. No. 60/305,219, filed Jul. 13, 2001, which is incorporated herein by reference in its entirety.

FIELD OF INVENTION

The present invention relates generally to broadband data transmission. More particularly, the invention relates to bi-directional communication devices, such as cable modems, adapted for use in multiple standard systems such as the North American and European DOCSIS standard systems.

BACKGROUND OF INVENTION

Bi-directional communication devices, such as cable modems, have been designed to specifically operate under a single standard, such as the North American Data Over Cable Service Interface Specifications (DOCSIS) or the European DOCSIS standards. The European version of the DOCSIS standard was not originally available when DOCSIS was first proposed to European customers. Many European cable operators started deploying the North American DOCSIS standard. These cable operators now express the need to change to a European DOCSIS-compliant system.

There are three main differences between a European DOCSIS cable modem and a North American DOCSIS cable modem. First, a diplexer within a cable modem has different cross over points, depending on whether the modem is a European DOCSIS or North American DOCSIS device, since the forward (downstream) and the return (upstream) assigned data channel bandwidths are slightly different in the two standards. This difference in the diplexer crossover point is realized by the use of different high pass filter and low pass filter cutoff frequencies in the European and North American DOCSIS compliant devices. Second, the forward data channel bandwidth is 8 MHz for a European DOCSIS compliant device, while the forward data channel bandwidth for a North American DOCSIS compliant device is 6 MHz. This difference in channel bandwidth is accomplished through the use of a different surface acoustic wave (SAW) filter to maximize performance when additional channels are located next to the desired channel without any guard band. Third, the forward data channel for European DOCSIS stipulates an alternative forward error correction (FEC) scheme than that used for North American DOCSIS. Accordingly, as cable operators change over to use of European DOCSIS-compliant cable modems, the corresponding costs rise in economies of scale to manufacture a different cable modem for each DOCSIS standard.

SUMMARY OF INVENTION

The disadvantages heretofore associated with the prior art are overcome by the present invention, a method and apparatus for processing multi-mode (multi-standard) communication signals through a bi-directional communication device, such as a cable modem. The method includes tuning to one of a plurality of channels, and searching for a downstream signal, which has a first bandwidth complying with a first service interface standard.

In an instance where the downstream signal is not detected, the search is repeated for a downstream signal having a second bandwidth complying with a second service interface standard. In an instance where the downstream signal is not detected, the next channel is tuned and a search for a downstream signal is performed, which has a first bandwidth complying with the first service interface standard. In an instance where a downstream signal is not detected, a search for a downstream signal having the second bandwidth complying with the second service interface standard is performed. The method proceeds to iteratively tune and search through each channel until a downstream data signal is detected.

The apparatus comprises a diplexer including a high-pass filter and a low-pass filter, downstream processing circuitry that is coupled to the high-pass filter, and upstream processing circuitry that is coupled to the low-pass filter. A detector searches a plurality of frequencies, where each frequency is checked for acquisition of at least one service interface standard (e.g.—European and North American DOCSIS) downstream data signal, prior to checking the next frequency.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, whenever possible, to designate identical elements that are common to the figures.

DETAILED DESCRIPTION OF THE INVENTION

While the invention will be primarily described within the context of a cable modem in a data communications system, it will be appreciated by those skilled in the art that other multi-mode/multi-standard, bi-directional communications devices, such as a satellite terminal, a digital subscriber line (DSL) modem, and the like may also incorporate and benefit from the present invention. Providing a single cable modem that could operate under multiple standard systems, such as the North American and European DOCSIS standard systems, would reduce the overall costs for the manufacturers, resellers, and renters, through the economy of scale.

In accordance with one embodiment of the invention, a cable modem includes a single diplexer, which is used to facilitate the coupling of, for example, a computer device to a service provider via a cable transport network. In particular, the exemplary cable modem is utilized to provide downstream broadband data signals from the service provider to the computer device. Additionally, the exemplary cable modem is utilized to transfer upstream baseband data signals from the illustrative computer back to the service provider. More specifically, the exemplary cable modem is capable of selectively operating within the different downstream bandwidth constraints under both the North American DOCSIS and the European DOCSIS standards, which are incorporated by reference herein in their respective entireties. The cable modem of the instant embodiment is also capable of selectively passing through the upstream data signals in compliance with the European DOCSIS standard, as well as passing through a substantial portion of the upstream data signals in compliance with the North American DOCSIS standard.

Figure 1:
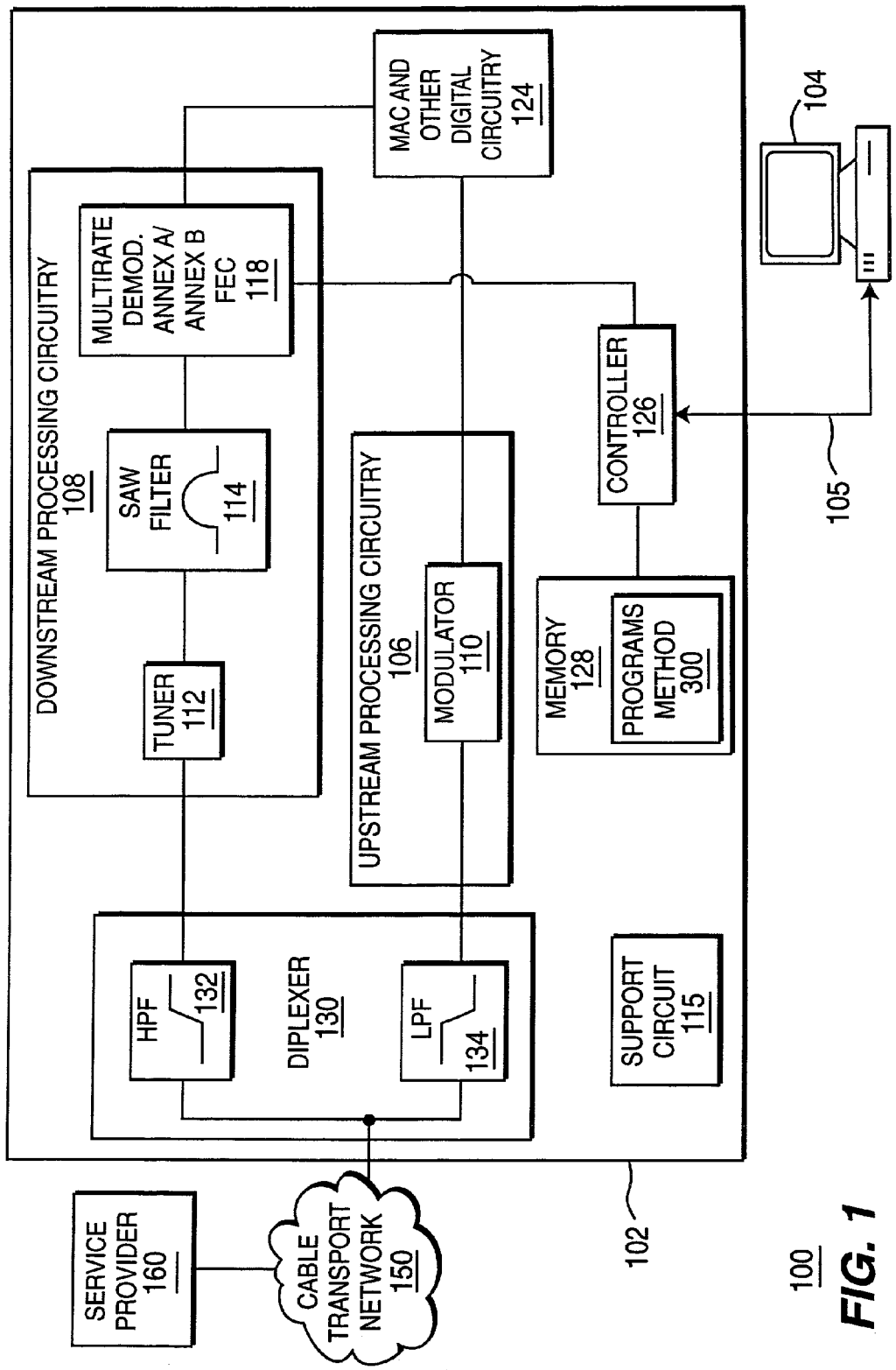
FIG. 1 is a block diagram of an exemplary multi-mode bi-directional communications device for use in a data communications system in accordance with the principles of the present invention.

FIG. 1 depicts a block diagram of a data communications system 100 having a multi-mode bi-directional communications device 102, the device being a cable modem in the instant illustrated embodiment. The data communications system 100 comprises a service provider 160 that provides electronically transmitted, digital data to an end user having an input/output (I/O) device 104, such as a computer, handheld device, laptop, or any other device capable or transmitting and/or receiving data. The service provider 160 is coupled to the multi-mode bi-directional communications device (e.g., cable modem) 102 via a cable transport network 150.

The service provider 160 may be any entity capable of providing low, medium and/or high-speed data transmission, multiple voice channels, video channels, and the like. In particular, data is transmitted via radio frequency (RF) carrier signals by the service provider 160 in formats such as the various satellite broadcast formats (e.g., Digital Broadcast Satellite (DBS)), cable transmission systems (e.g., high definition television (HDTV)), digital video broadcasting ((DVB-C) (i.e., European digital cable standard)), and the like.

The service provider 160 provides the data over the cable transport network 150. In one embodiment, the cable transport network 150 is a conventional bi-directional hybrid fiber-coax cable network, such as specified under the North American or European DOCSIS standards.

In operation, the service provider 160 modulates the downstream data signals with an RF carrier signal, and provides such signals via the cable transport network 150 to the cable modem 102, where the RF signals are received, tuned, and filtered to a predetermined intermediate frequency (IF) signal. The IF signal is then demodulated into one or more respective baseband signals, and otherwise processed into, illustratively, data packets. The data packets are further transmitted, illustratively, through cabling 105 (e.g., universal serial bus (USB), coaxial cable, and the like) to the computer device 104. Similarly, a user of the computer device 104 may send upstream data signals to the cable modem 102 via the cabling 105. The cable modem 102 receives upstream baseband data signals from the computer device 104, and then modulates and upconverts the data signals onto a RF carrier for transmission back to the service provider 160, via the cable transport network 150.

The cable modem 102 comprises a diplexer 130, upstream processing circuitry 106, downstream processing circuitry 108, a controller 126, and a media access controller (MAC) 124. The diplexer 130 communicates data between the cable transport network 150 and the cable modem 102. The diplexer 130 comprises a high-pass filter 132 and a low-pass filter 134. The high-pass filter 132 provides processed downstream RF signals to the computer device 104. In particular, RF signals having a frequency greater than, e.g., 106 MHz are passed through, while those frequencies below 106 MHz are attenuated.

The diplexer 130 is coupled to the upstream 106 and downstream 108 processing circuitry. The high-pass filter HPF 132 passes the downstream data signals to the downstream processing circuitry 108 and the low-pass filter LPF 134 receives return signals (e.g., user requests) from the upstream processing circuitry 106. As discussed in further detail below, both the HPF 132 and the LPF 134 may be utilized during operation under the European DOCSIS standard or during operation under the North American DOCSIS standard.

Support circuitry 115, such as voltage regulators, amplifiers, and the like, supports the operation of the downstream 108 and upstream 106 processing circuitry, as well as other circuitry in the cable modem 102. Additionally, the controller 126 may be an embedded micro-controller that controls the modulator 110, demodulator 118, and the MAC 124.

The downstream processing circuitry 108 comprises a tuner 112, a multi-rate demodulator 118, which is selectively coupled to the tuner 112 through an 8 MHz bandwidth surface acoustic wave (SAW) filter 114. The tuner 112 may illustratively be model type DIT9310, manufactured by Thomson Multimedia, Inc., of Indianapolis, Ind. When operating under the European DOCSIS mode, the SAW filter 114 provides an IF signal having an 8 MHz bandwidth to the multi-rate demodulator 118, which operates within the requirements under the ITU J.83 Annex A standard. Alternatively, when operating in the North American DOCSIS mode, the SAW filter 114 provides an IF signal having a 8 MHz bandwidth to the demodulator 118, which then operates within the requirements under the ITU J.83 Annex B standard. The multi-rate demodulator 118 may be model type BCM3350, manufactured by Broadcom Inc., of Irvine, Calif.

The downstream processing circuitry 108 selectively tunes, demodulates, and otherwise "receives" at least one of a plurality of downstream data signals in response to a selection signal provided by the controller 126. The diplexer 130 passes all downstream data signals above 106 MHz to the tuner 112 via the high-pass filter HPF 132. The tuner 112 downconverts the received downstream RF signals from the HPF 132 to a predetermined IF frequency signal. The tuner 112 passes the IF frequency signal to the demodulator 118 via the 8 MHz SAW filter 114. The filtered IF signals are demodulated by the demodulator circuitry 118 to provide one or more respective baseband signals. The baseband signals are sent to the MAC 124, where the received signals are packetized into a bitstream, as discussed in further detail below.

When operating under the North American DOCSIS standard, the SAW filter 114 provides a 36.125 MHz centered IF signal having a 8 MHz bandwidth to the demodulator 118, where the demodulator 118 extracts the baseband signal(s) therein. Similarly, when operating under the European DOCSIS standard, the SAW filter 114 provides a 36.125 MHz centered IF signal having an 8 MHz bandwidth to the demodulator 118, where the demodulator 118 extracts the baseband signal(s) therein. In any case, the baseband signals are sent to the media access controller (MAC) 124 for subsequent transport to the computer device, as managed by controller 126.

The baseband signals are illustratively formed into packets (e.g., MPEG elementary stream packets). The media access controller 124, controller 126, and other digital circuitry may further process the packetized data (e.g., attach or encapsulate in appropriate transport packets) and then distribute the processed, packetized data to the computer device 104 (or other information appliance). In particular, the MAC 124 sends the packetized bitstream to the controller 126, where the data is processed (e.g., formatted) for interface with the computer device 104. The controller 126 transfers the formatted packetized bit stream (via cabling 105) to the computer device 104 for further processing (e.g., extraction and upconversion of the data).

The upstream processing circuitry 106 comprises a modulator 110 and other support circuits 115, such as amplifiers, filters, voltage regulators, and the like (not shown). The modulator 110 modulates upstream signals from the computer device 104 for subsequent transmission to the service provider 160. In particular, a user sends data, data requests, or some other user request to the service provider. The user request is up converted and modulated to an upstream RF signal. In one embodiment, the multi-rate demodulator 118, modulator 110, and MAC 124 may be physically integrated in one ASIC. In the alternative, separate components may also be utilized, as would be readily apparent to those skilled in the art.

The controller 126 is coupled to memory 128, which stores executable programs that control the cable modem 102. The memory 128 includes non-volatile memory, such as an EEPROM, and may include volatile memory such as RAM and cache memory, as required. The memory 128 stores program code, which provides a method 300 for detecting the type of downstream signals received from the cable transport network 150. In particular, the method 300 performs a search operation to determine if a tuned downstream signal falls under the European DOCSIS standard or North American DOCSIS standard. Once the type of downstream signal is detected, the demodulator 118 is set to further process the downstream signal (i.e., extract the baseband signals).

Additionally, once the downstream signal is identified, the modulator 110 can also be set to the Cable Modem Termination System (CMTS) specified signal type to provide upstream signals. It is noted that the CMTS is an element of the DOCSIS standards that provides a set of specifications for high-speed data transfer over cable television systems. The CMTS specified signal type dictates, for example, the multiplexing technique (e.g., TDMA, CDMA, among others), compression technique (e.g., QPSK) symbol rate, and other parameters for setting the modulator 110.

Figure 2:
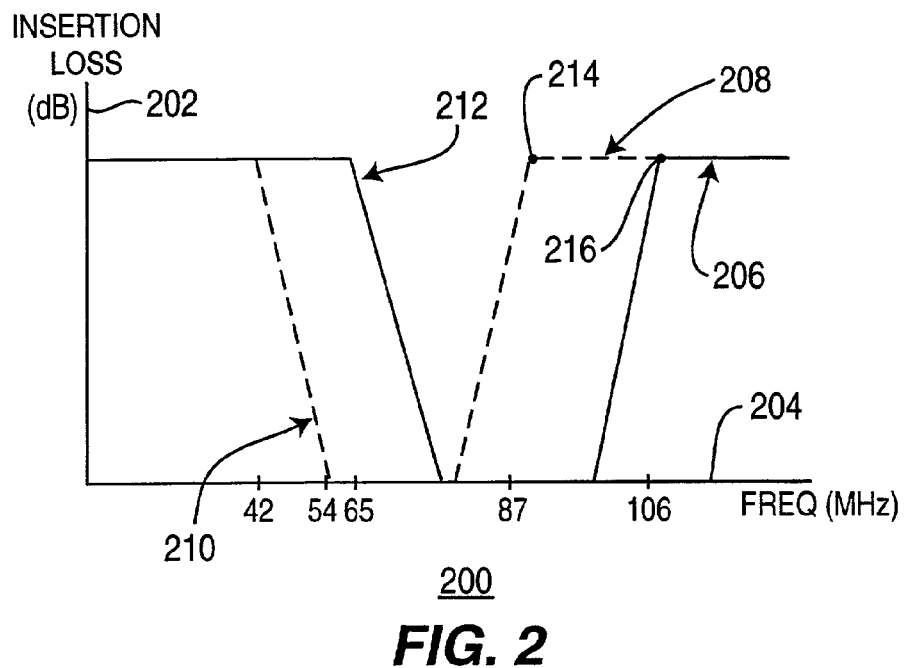
FIG. 2 is an exemplary graphical representation of a response curve for the diplexer of FIG. 1, in accordance with the principles of the present invention.

FIG. 2 depicts a graphical representation of a response curve 200 for the diplexer 130 of FIG. 1. The response curve 200 comprises an ordinate 202 and an abscissa 204. The ordinate 202 represents insertion loss (plotted in decibels (dB)), and the abscissa 204 represents frequency (plotted in megahertz (MHz)).

Referring to FIGS. 1 and 2 together, it can be seen that the high-pass filter HPF 132 passes RF data signals having a frequency greater than 106 MHz, as shown by HPF response curve 206. Under the North American DOCSIS standard, the downstream data signals are transmitted at a center frequency greater than 90 MHz (HPF response curve 208 (shown in phantom)). Specifically, the downstream signal is 6 MHz wide, such that the HPF 132 is capable of passing frequencies of at least 87 MHz, as shown as the corner frequency 214 of FIG. 2.

Under the European DOCSIS standard, the downstream data signals are transmitted at a center frequency greater than 110 MHz. Specifically, the downstream signal is 8 MHz wide, such that the HPF 132 is capable of passing frequencies of at least 106 MHz, as shown as the corner frequency 216 of FIG. 2. In one embodiment of the invention, only a single high-pass filter HPF 132 is utilized in the diplexer 130. Specifically, the HPF 132 passes RF data signals above a center frequency of 110 MHz. Under the North American DOCSIS standard, data signals having center frequencies below 110 MHz will not be passed to the demodulator 118. However, most North American and European cable operators use frequencies higher than 106 MHz, so those signals having center frequencies less than 110 MHz are of little consequence to an end user.

The North American cable operators usually put analog video signals at low frequencies (e.g., 54–300 MHz), since cable plants typically have better signal to noise ratios and less ingress at lower frequencies. It is noted that the number of analog signals varies from cable plant to cable plant. Analog video signals are more susceptible to these channel impairments than cable modem signals. As such, cable operators usually put the cable modem downstream data channel at higher frequencies (i.e., above 106 MHz). Specifically, digital signals are usually added at higher frequencies (e.g., above 300 MHZ), since the higher frequencies are not used, and are available for channel formation. Further, since almost all digital downstream RF signals are above 106 Mhz under either the North American and European DOCSIS standards, the single HPF 132 is suitable for passing through such downstream RF data signals for further processing in the cable modem 102. The HPF digital response curve 206 in FIG. 2 illustratively depicts a low-level insertion loss 202 for frequencies greater than 106 MHz.

Figure 4:
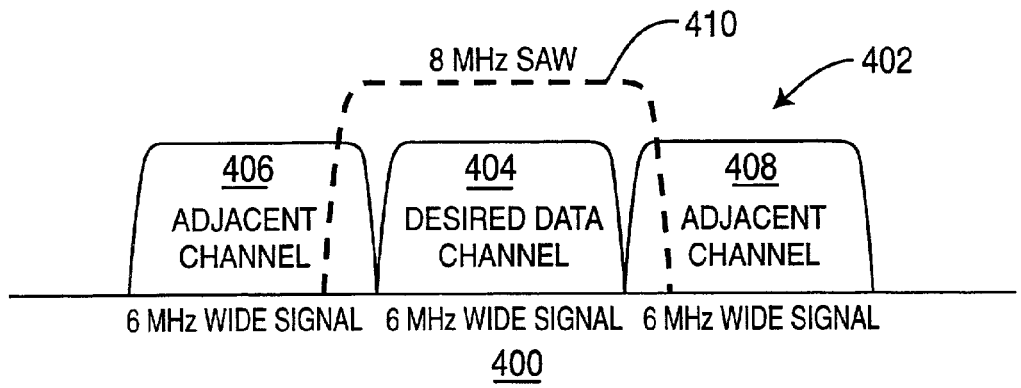
FIG. 4 depicts an exemplary frequency response curve for data channels do operating under the North American DOCSIS standard in relationship to a SAW filter of the cable modem of FIG. 1, and in accordance with the principles of the present invention.

FIG. 4 depicts a frequency response curve 400 for data channels 402 operating in compliance with the North American DOCSIS standard in relationship to a SAW filter 114 of the cable modem 102 of FIG. 1. It is noted that the downstream data channel is 8 MHz wide for the European DOCSIS standard, while the North American DOCSIS standard is 6 MHz wide. In prior art cable modems, a different SAW filter was used under each DOCSIS standard to maximize performance when additional channels are located next to the desired channel without any guard bands. In particular, a 6 MHz SAW filter was used under the North American DOCSIS standard, while an 8 MHz SAW filter was used under the European DOCSIS standard. In the embodiment of the cable modem 102 described herein, only a single 8 MHz SAW filter is utilized since the SAW filter has to be at least as wide as the largest bandwidth signal for the cable modem 102 to operate properly. Once the high-pass filter HPF 132 passes data signals above 106 MHz, as noted above with regard to FIG. 1, the SAW filter 114 provides a centered IF signal having an 8 MHz bandwidth to the demodulator 118.

Referring to FIG. 4, a desired data channel 404 having a bandwidth of 6 MHz under the North American DOCSIS standard is shown. Additionally, two adjacent data channels 406 and 408 also having 6 MHz bandwidths may also be present. For example, the desired channel selected by a user may have a center frequency of 120 MHz. The adjacent channels 406 and 408, if present, will respectively have center frequencies of 114 MHz and 126 MHz (without guard bands disposed therebetween). As further illustrated by curve 410 in FIG. 4, the 8 MHz SAW filter passes the entire 6 MHz wide signal of the desired channel 404, plus a 1 MHz signal portion of each adjacent channel 406 and 408. The additional two MHz of data signals from the adjacent channels 406 and 408 may degrade the performance of the cable modem 102. For example, if the total signal power is increased, additional adjacent channel power can distort active devices (e.g., demodulator 118) after the SAW filter 114 in the downstream processing circuitry 108. Alternatively, if the total power is kept constant, then the desired signal will not use the full range of the analog to digital converter (not shown) in the demodulator 118.

Figure 5:
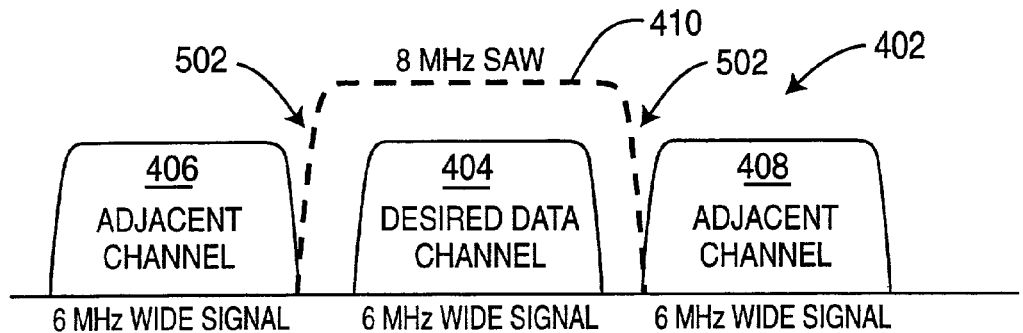
FIG. 5 depicts an exemplary frequency response curve for data channels having guard bands operating under the North American DOCSIS standard in relationship to the SAW filter of the cable modem of FIG. 1, and in accordance with the principles of the present invention.

FIG. 5 depicts a frequency response curve 500 for data channels having guard bands 502 operating under the North American DOCSIS standard in relationship to the SAW filter 114 of the cable modem of FIG. 1. A service provider 160 may provide 1 MHz guard bands 502 between the desired data channel 404 and adjacent channels 406 and 408, thereby minimizing degradation of performance for the desired channel 404 caused by adjacent channels 406 and 408.

Figure 3A:
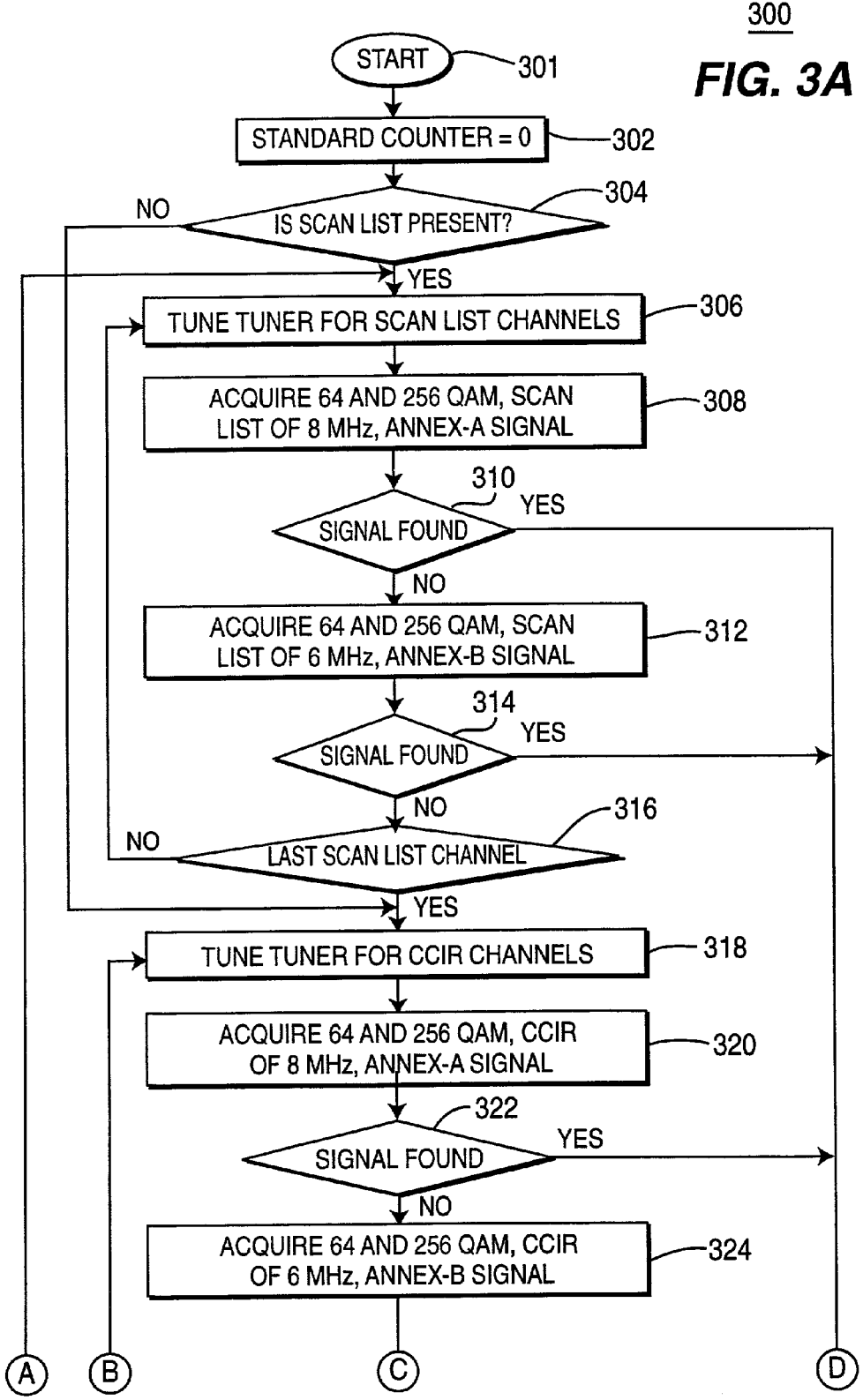
FIG. 3 is a flowchart of an exemplary method for detecting a downstream signal using the device of FIG. 1, in accordance with the principles of the present invention.
Figure 3B:
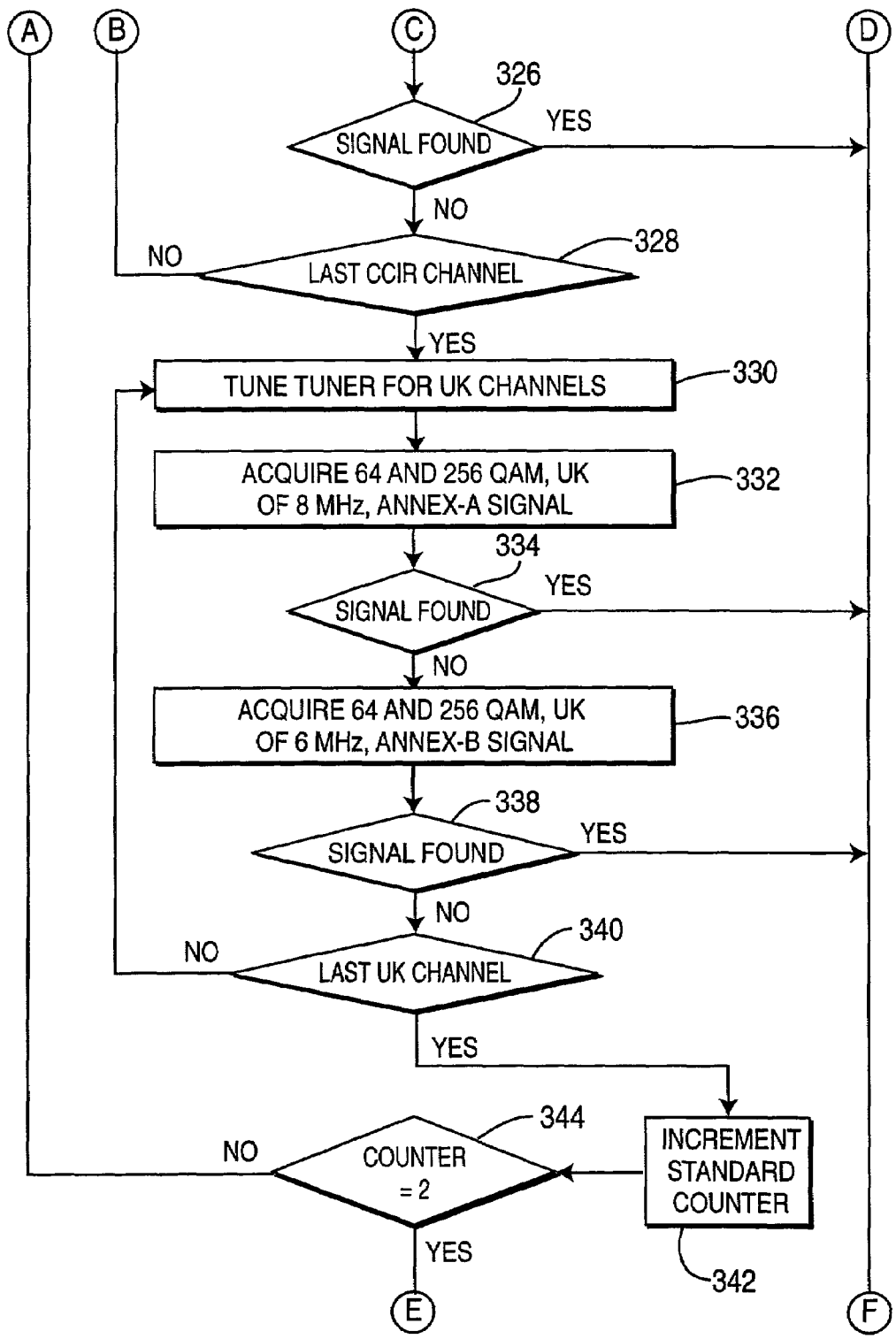
Figure 3C:
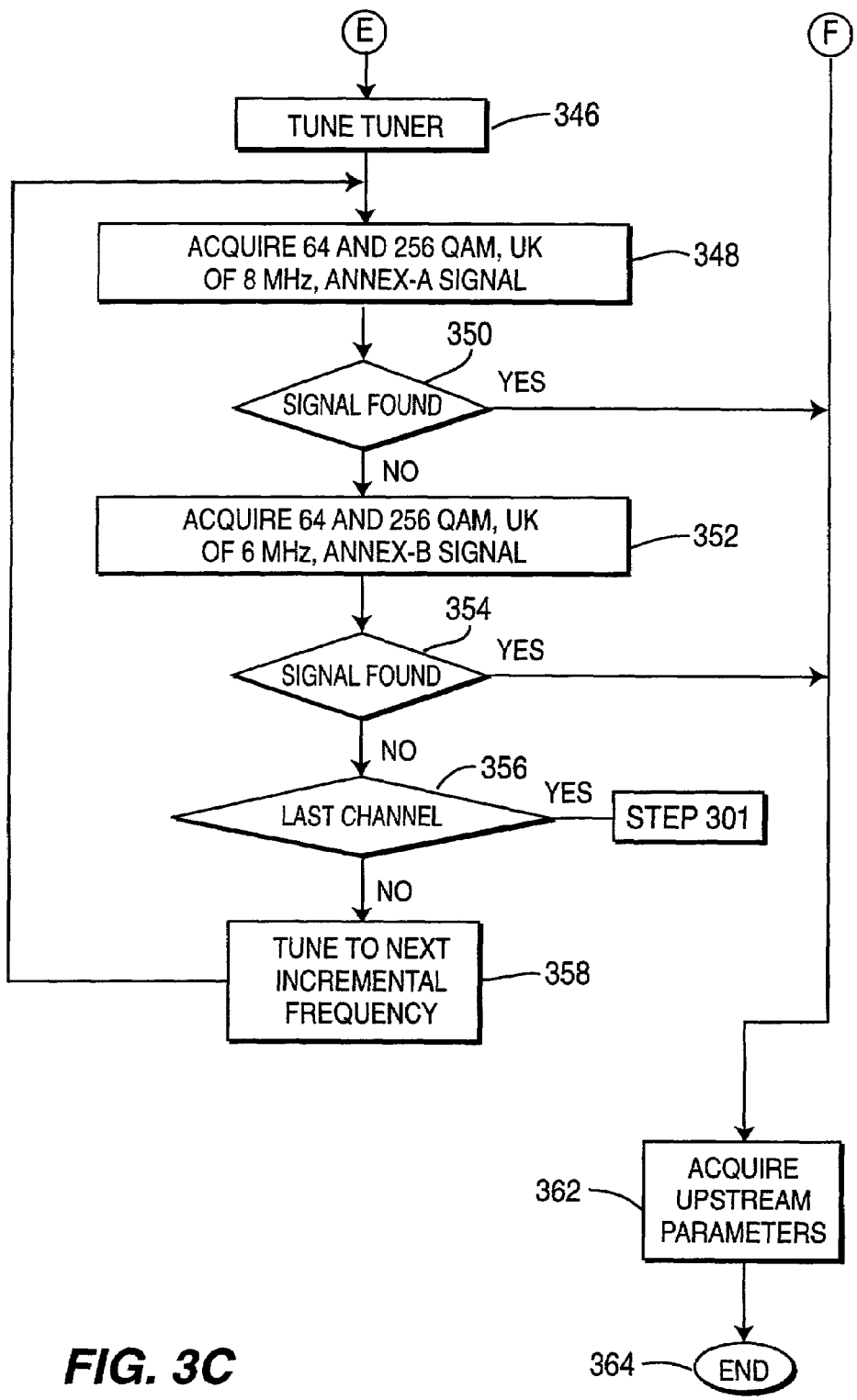

FIG. 3 depicts a flowchart of a method 300 for detecting a downstream signal using the cable modem 102 of FIG. 1. In particular, the method 300 tunes the downstream data channel to a specified frequency, and then both European and North American 64 QAM and 256 QAM signal acquisitions are attempted before tuning to the next frequency.

The illustrative method 300 is optimized for the European DOCSIS mode of operation. In one embodiment, the method 300 searches for the downstream signal from a plurality of preset frequency channels first. If the downstream signal is not found in any of the preset channels, the method 300 searches for the downstream signal from a plurality of CCIR (Consultative Committee for International Radio) frequency channels. If the downstream signal is not found in any of the CCIR channels, the method 300 then searches for the downstream signal from a plurality of UK (United Kingdom) frequency channels.

In particular, the method 300 starts at step 301, and proceeds to step 302 where a counter is set equal to zero. At step 304, the method 300 determines whether a scan list is present. Specifically, in one embodiment, the cable modem illustratively stores a scan list having a plurality of preset channels (e.g., ten preset channels). The preset channels may be, for example, unusual vendor channels that take a long time to find. The ten illustrative frequency settings are stored in the memory 128 (e.g., EEPROM). If the determination at step 304 is negatively answered, then the method 300 proceeds to step 318, as discussed in detail below.

If the determination at step 304 is affirmatively answered, then at step 306, the tuner 112 is tuned to, illustratively, a first of a plurality of the scan list (i.e., predetermined) channel frequencies. That is, the cable modem 102 sequentially checks each of these ten preset channels prior to checking any other type channels (e.g., the European CCIR and UK channels or the North American IRC and HRC channels, and the like), since the preset channels may be frequently utilized. After tuning to a first channel frequency at step 306, the method 300 at step 308, searches for both 64 QAM and 256 QAM signal acquisition of an 8 MHz wide, European DOCSIS standard (Annex A) downstream signal. If at step 310, the downstream signal is acquired, the method 300 proceeds to step 362, where the upstream signal parameters are acquired.

At step 362, once the downstream signal is acquired, the upstream processing circuitry 106 must determine the appropriate power signal, modulation scheme, among other upstream parameters for transmitting information upstream. In particular, the modulator 110 sets the CMTS specified channel frequency in order to enable modulation of the baseband signals sent upstream from the computer device 104. The method 300 then proceeds to step 364, where the method 300 ends.

If, at step 310, an 8 MHz wide, Annex-A downstream signal has not been detected under the European standard for that tuned preset channel, then the method 300 proceeds to step 312. At step 312, the same channel frequency (e.g., preset channel) is checked under the North American DOCSIS standard (Annex-B). That is, the tuner 112 is kept at the same channel frequency and both 64 QAM and 256 QAM signal acquisition is attempted for a 6 MHz wide, Annex-B downstream signal. At step 314, if a 6 MHz, North American QAM signal is detected, then the method 300 proceeds to step 362, where the demodulator 118 and modulator 110 are set to enable further processing of the baseband signals, as discussed above.

If, however, at step 314, one of the North American standard QAM signals is not detected, at step 316, the method 300 queries whether the tuned channel frequency is the last of its type to be searched. If the illustrative last preset channel frequency has not been searched, then the method 300 proceeds to step 306, where the tuner 112 is sequentially tuned to the next preset channel frequency. Steps 306 through 316 are sequentially repeated for each preset channel in the scan list, until either a downstream signal is acquired from one of the preset channels (and the method proceeds to step 362), or at step 316, the last preset channel is searched without acquiring the downstream signal. If at step 316, the last preset channel is searched without acquiring the downstream signal, the method 300 proceeds to step 318.

It is noted that this technique of first tuning to a particular channel frequency, then checking for signal acquisition of either 64 or 256 QAM signals for both Annex-A and Annex-B on that same tuned channel, prior to tuning to a next channel, is performed throughout the method 300 for all the types of channels (e.g., CCIR, UK, among others). As such, the method 300 minimizes search time by only tuning the tuner 112 once for both downstream data channel modes.

At step 318, the tuner 112 tunes to a first CCIR channel. Presently, any one of 94 CCIR channels may carry a downstream signal. In particular, once the tuner 112 tunes a CCIR channel frequency (e.g. starting with the lowest frequency channel), at step 320, a search is performed to acquire a 64 or 256 QAM, 8 MHz wide, downstream signal under the European (Annex A) DOCSIS standard. That is, both 64 QAM and 256 QAM signal acquisition is attempted at the currently tuned channel, before tuning to the next channel frequency.

At step 322, if a 8 MHz, European QAM signal is detected for that tuned CCIR channel, then the method 300 proceeds to step 362, where the demodulator 118 and modulator 110 are set to enable further processing of the baseband signals, as discussed above. If at step 322, an 8 MHz wide, Annex-A downstream signal has not been detected under the European standard for that tuned CCIR channel, then the method 300 proceeds to step 324.

At step 324, the same channel frequency (e.g., CCIR channel) is checked under the North American DOCSIS standard (Annex-B). That is, the tuner 112 is kept at the same channel frequency and both 64 QAM and 256 QAM signal acquisition is attempted for a 6 MHz wide, Annex-B downstream signal. At step 326, if a 6 MHz, North American QAM signal is detected, then the method 300 proceeds to step 362, where the demodulator 118 and modulator 110 are set to enable further processing of the baseband signals, as discussed above.

If, however, at step 326, one of the North American standard QAM signals is not detected, at step 328, the method 300 queries whether the tuned channel frequency is the last of its type to be searched. If the illustrative last CCIR channel frequency has not been searched, then the method 300 proceeds to step 318, where the tuner 112 is sequentially tuned to the next CCIR channel frequency. Steps 318 through 328 are sequentially repeated for each CCIR channel, until either a downstream signal is acquired from one of the CCIR channels (and the method proceeds to step 362), or at step 328, the last CCIR channel is searched without acquiring the downstream signal. If at step 328, the last CCIR channel is searched without acquiring the downstream signal, the method 300 proceeds to step 330.

At step 330, the tuner 112 tunes to a first UK (United Kingdom) channel. Presently, any one of 94 CCIR channels may carry a downstream signal. In particular, once the tuner 112 tunes a CCIR channel frequency, at step 332, a search is performed to acquire a 64 or 256 QAM, 8 MHz wide, downstream signal under the European (Annex A) DOCSIS standard. That is, both 64 QAM and 256 QAM signal acquisition is attempted at each channel, before tuning to the next channel frequency.

At step 334, if a 8 MHz, European QAM signal is detected for that tuned UK channel, then the method 300 proceeds to step 362, where the demodulator 118 and modulator 110 are set to enable further processing of the baseband signals, as discussed above. If at step 334, an 8 MHz wide, Annex-A downstream signal has not been detected under the European standard for that tuned UK channel, then the method 300 proceeds to step 336.

At step 336, the same channel frequency (e.g., UK channel) is checked under the North American DOCSIS standard (Annex-B). That is, the tuner 112 is kept at the same channel frequency and both 64 QAM and 256 QAM signal acquisition is attempted for a 6 MHz wide, Annex-B downstream signal. At step 338, if a 6 MHz, North American QAM signal is detected, then the method 300 proceeds to step 362, where the demodulator 118 and modulator 110 are set to enable further processing of the baseband signals, as discussed above.

If, however, at step 338, one of the North American standard QAM signals is not detected, at step 340, the method 300 queries whether the tuned channel frequency is the last of its type to be searched. If the illustrative last UK channel frequency has not been searched, then method 300 proceeds to step 330, where the tuner 112 is sequentially tuned to the next UK channel frequency. Steps 330 through 340 are sequentially repeated for each UK channel, until either a downstream signal is acquired from one of the UK channels (and the method proceeds to step 362), or at step 340, the last UK channel is searched without acquiring the downstream signal. If at step 340, the last UK channel is searched without acquiring the downstream signal, the method 300 proceeds to step 342.

At step 342, the counter is incremented by one, which signifies a first pass through steps 304 to 340. In one embodiment, steps 304 through 340 are repeated two times until either a downstream signal is detected or the counter is incremented to a value of two. Specifically, at step 342, if a downstream data signal is not detected after a first pass though all the preset, CCIR, or UK channel frequencies, the method 300 performs a second pass through the preset, CCIR and UK channel frequencies as discussed above for steps 304 through 340.

Method 300 performs the second pass over each of the channels to provide the cable modem 102 a second opportunity to identify the downstream signal and to improve efficiency of the cable modem 102. Such second opportunity may be necessary, for example, if a downstream, non cable modem related interruption occurs, (e.g., an intermittency caused at the head-end, a brown-out, or other downstream interruption), which may cause the cable modem 102 to lose the downstream signal.

If, at any of the steps 310, 314, 322, 326, 334, or 338, one of the channel frequencies is detected during the second pass of steps 304 through 340, the method 300 proceeds to step 362 as discussed above. If, however, none of the channel frequencies is detected during the second pass of steps 304 through 340, and at step 344 the counter equals two (counter=2), method 300 proceeds to step 346.

At steps 346, the tuner 112 is tuned to first of a plurality of frequencies (i.e., center frequencies) illustratively between 110 MHz and 862 Mhz, in incremental steps (e.g., 375 KHz steps). In particular, at step 346, the tuner 112 is tuned to the first frequency (e.g., 110 MHz). At step 348, both 64 QAM and 256 QAM signal acquisition is attempted first for a downstream European 8 MHz, Annex-A signal. At step 350, if the European 8 MHz, Annex-A signal is detected, then the method 300 proceeds to step 362 as discussed above.

If at step 350, the European 8 MHz, Annex-A signal is not detected, then at step 352, signal acquisition for a North American 6 MHz Annex-B signal is attempted for the first tuned frequency. At step 354, if the North American 6 MHz Annex-B signal is detected, then the method 300 proceeds to step 362 as discussed above. If at step 354, the North American 6 MHz Annex-B signal is not detected, then the method 300 proceeds to step 356.

At step 356, a query is made to determine if the tuned channel is the last channel to be searched. If, at step 356 the query is negatively answered, then method 300 proceeds to step 358, where the tuner 112 is incremented to the next frequency. For example, the tuner is tuned to 110.375 MHz (i.e., 110 MHz+ incremental 375 KHz). Steps 348 through 358 are repeated, until either a downstream signal is acquired, or at step 356, the last channel has been searched. If at step 356, the last channel (e.g., 862 MHz) has been searched, then the method 300 proceeds to step 301 where the entire method 300 is repeated until a downstream signal is acquired. Once a downstream signal has been acquired, and at step 362, the upstream parameters are acquired, the method 300 ends at step 364.

Method 300 has been discussed in terms of optimizing the cable modem to search for known European channels, prior to methodically stepping through the frequency spectrum between 110 MHz and 862 MHz i.e., (steps 346–358), which is time consuming. It is noted that in another embodiment, the cable modem 102 may be optimized to search through North American DOCSIS by changing the order of acquisition to 6 MHz Annex-B channels first instead of the 8 MHz Annex-A channels as described in method 300.

In even another embodiment, the cable modem 102 may be further optimized to search through North American (e.g., harmonically related carrier (HRC) and incrementally related carrier (IRC)) channels instead of the CCIR or UK channels. That is, step 318 would include sequentially tuning through the 125 IRC channels, and step 330 would include sequentially tuning through the 125 HRC channels.

Of course, detection for both 64 and 256 QAM downstream signals under the Annex-A and B standards would be performed at each tuned frequency, prior to tuning to the next IRC or HRC channel.

In still another embodiment, method 300 could be designed to check European and North American frequencies evenly. Specifically, the method 300 would check for 64 and 256 QAM 8 MHz Annex-A, and then the 64 and 256 QAM 6 MHz Annex-B signal acquisitions for each of the preset channels (e.g., 10 preset channels). Next, the 94 CCIR channels would be checked in a similar manner, followed by the 125 IRC channels, the 94 UK channels, and the 125 HRC channels. If a downstream signal cannot be acquired, the method would search a second time through the known preset, CCIR, IRC, UK, and HRC channels, such as discussed at steps 342 and 344. If a downstream signal cannot be acquired on the second pass through the known channels, then the method would proceed to check through all frequencies between 110 MHz and 862 MHz, as discussed at steps 346 through 358 or method 300.

As discussed above, the modem 110 settings are not set by the cable modem 102 until the downstream signal is detected and the DOCSIS standard (i.e., Annex A or B) is identified. Once the DOCSIS standard is known, the modulator 110 can be set to provide upstream signals back to the service provider 160.

In one embodiment of the invention, the cable modem 102 is provided with a single 65 MHz low-pass filter 134, which may be used for upstream signals under both North American and European DOCSIS standards. In particular, a single 65 MHz low-pass filter 134 passes through the upstream data signals having a frequency between 5 Mhz and 65 MHz, as required under the European DOCSIS standard. The 65 MHz low-pass filter 134 may also be utilized under the North American DOCSIS standard, so that the additional bandwidth between 42 MHz and 65 MHz is available. Under the North American DOCSIS standard, the upstream data signals are typically transmitted in a frequency range between 5 Mhz and 42 MHz.

Referring to FIG. 2, the LPF response curve 210 (drawn in phantom) illustratively depicts a low-level insertion loss 202 for frequencies less than 42 MHz when operating under the North American DOCSIS standard. Under the European DOCSIS standard, the upstream data signals are transmitted in a frequency range between 5 MHz and 65 MHz. The LPF response curve 212 of FIG. 2 illustratively depicts a low-level insertion loss 202 for frequencies less than 65 MHz when operating under the European, as well as the North American DOCSIS standards. As such, when the cable modem 102 is operating under the North American standard, the extra bandwidth availability (42–65 MHz) may be utilized to relieve a congested upstream path in instances where many users are actively accessing the upstream path.

Although various embodiments that incorporate the teachings of the present invention have been shown and described in detail herein, those skilled in the art can readily devise many other varied embodiments that still incorporate these teachings.

What is claimed is:

1. A method for use in a bi-directional communication device, said method comprising:
    iteratively performing the following steps for each of a plurality of communications channels until a downstream data signal is detected;
    selecting a communications channel from said plurality of communications channels;
    checking for a downstream signal having a first bandwidth complying with a first system interface standard;
    if said downstream signal having said first bandwidth is not detected, checking said selected communications channel for a downstream signal having a second bandwidth complying with a second system interface standard; and
    wherein said first and second system interface standards are selected from the group of standards including the North American DOCSIS standard and the European DOCSIS standard.

2. The method of claim 1, wherein the checking steps are optimized for a European DOCSIS standard, such that the first bandwidth is an 8 MHz wide downstream signal and the second bandwidth is a 6 MHz wide downstream signal.

3. The method of claim 1, wherein the checking steps are optimized for a North American DOCSIS standard, such that the first bandwidth is a 6 MHz wide downstream signal and the second bandwidth is an 8 MHz wide downstream signal.

4. The method of claim 1, wherein said plurality of communications channels comprises at least one of a plurality of preset channel frequencies, a plurality of CCIR channel frequencies, a plurality of UK channel frequencies, a plurality of HRC channel frequencies, and a plurality of IRC channel frequencies.

5. The method of claim 4, wherein said plurality of communications channels further comprises a continuous range of frequencies.

6. The method of claim 5, further comprising checking said continuous range of frequencies in incremental steps.

7. The method of claim 5, further comprising checking said at least one of the plurality of preset channel frequencies, the plurality of CCIR channel frequencies, the plurality of UK channel frequencies, the plurality of HRC channel frequencies, and the plurality of IRC channel frequencies, at least twice, prior to checking said continuous range of frequencies.

8. The method of claim 5, wherein the continuous range of frequencies comprises a frequency range between 110 MHz and 862 MHz.

9. The method of claim 1, further comprising:
    upon detecting a downstream data signal, setting a multi-rate demodulator in accordance with a DOCSIS standard of the downstream data signal; and
    setting a modulator in accordance with CMTS information in the downstream data signal.

10. The method of claim 1, wherein said bi-directional communication device is a cable modem.

11. A multi-mode bi-directional communications device, comprising:
    a diplexer including a high-pass filter and a low-pass filter;
    a tuner for selecting a communications channel from said plurality of communications channels;
    downstream processing circuitry coupled to the high-pass filter for checking for a downstream signal having a first bandwidth complying with a first system interface standard, and if said downstream signal having said first bandwidth is not detected, checking said selected communications channel for a downstream signal having a second bandwidth complying with a second system interface standard; and
    upstream processing circuitry coupled to the low-pass filter; and
    a detecting means for searching a plurality of communications channels, where each communication channel is checked for acquisition of a downstream data signal complying with one of a plurality of interface standards, prior to checking another communication channel wherein said first and second system interface standards are selected from the group of standard including the North American DOCSIS standard and the European DOCSIS standard.

12. The device of claim 11, wherein the downstream processing circuitry comprises:
   a tuner;
   a multi-rate demodulator; and
   a SAW filter, selectively coupled between the tuner and the demodulator.

13. The device of claim 11, wherein the SAW filter has a bandwidth of 8 MHz.

14. The device of claim 11, wherein the high-pass filter passes signals greater than 106 MHz.

15. The device of claim 11, wherein the low-pass filter passes signals less than 65 MHz.

16. The device of claim 11, wherein the multi-mode bi-directional communications device is a cable modem.

17. The device of claim 11, wherein the detecting means comprises:
   a controller means, for checking each of the plurality of communications channels for acquisition of at least one of a 64 and 256 QAM downstream signal having a bandwidth of either 8 MHz or 6 MHz.

18. The device of claim 17, wherein the plurality of communications channels comprises at least one of a plurality of preset channel frequencies, a plurality of CCIR channel frequencies, a plurality of UK channel frequencies, a plurality of HRC channel frequencies, and a plurality of IRC channel frequencies.

19. The device of claim 18, wherein said plurality of communications channels further comprises a continuous range of frequencies.

20. The device of claim 19, wherein a detecting means checks said continuous range of frequencies in incremental steps.

21. The device of claim 19, wherein a detecting means checks said at least one of the plurality of preset channel frequencies, a plurality of CCIR channel frequencies, a plurality of UK channel frequencies, a plurality of HRC channel frequencies, and a plurality of IRC channel frequencies.

22. The device of claim 19, wherein the continuous range of frequencies comprises a frequency range between 110 MHz and 862 MHz.

23. The device of claim 11, wherein the detecting means optimizes checking steps are for a European DOCSIS standard, such that the first bandwidth is an 8 MHz wide downstream signal and the second bandwidth is a 6 MHz wide downstream signal.

24. The device of claim 11, wherein the detecting means optimizes checking steps are for a North American DOCSIS standard, such that the first bandwidth is a 6 MHz wide downstream signal and the second bandwidth is an 8 MHz wide downstream signal.

25. The device of claim 11, further comprising:
   a detecting means wherein upon detecting a downstream data signal, setting a multi-rate demodulator in accordance with a DOCSIS standard of the downstream data signal.

* * * * *